J. ALBERT.
GRASS CUTTER.
APPLICATION FILED OCT. 26, 1915.
1,181,281. Patented May 2, 1916.
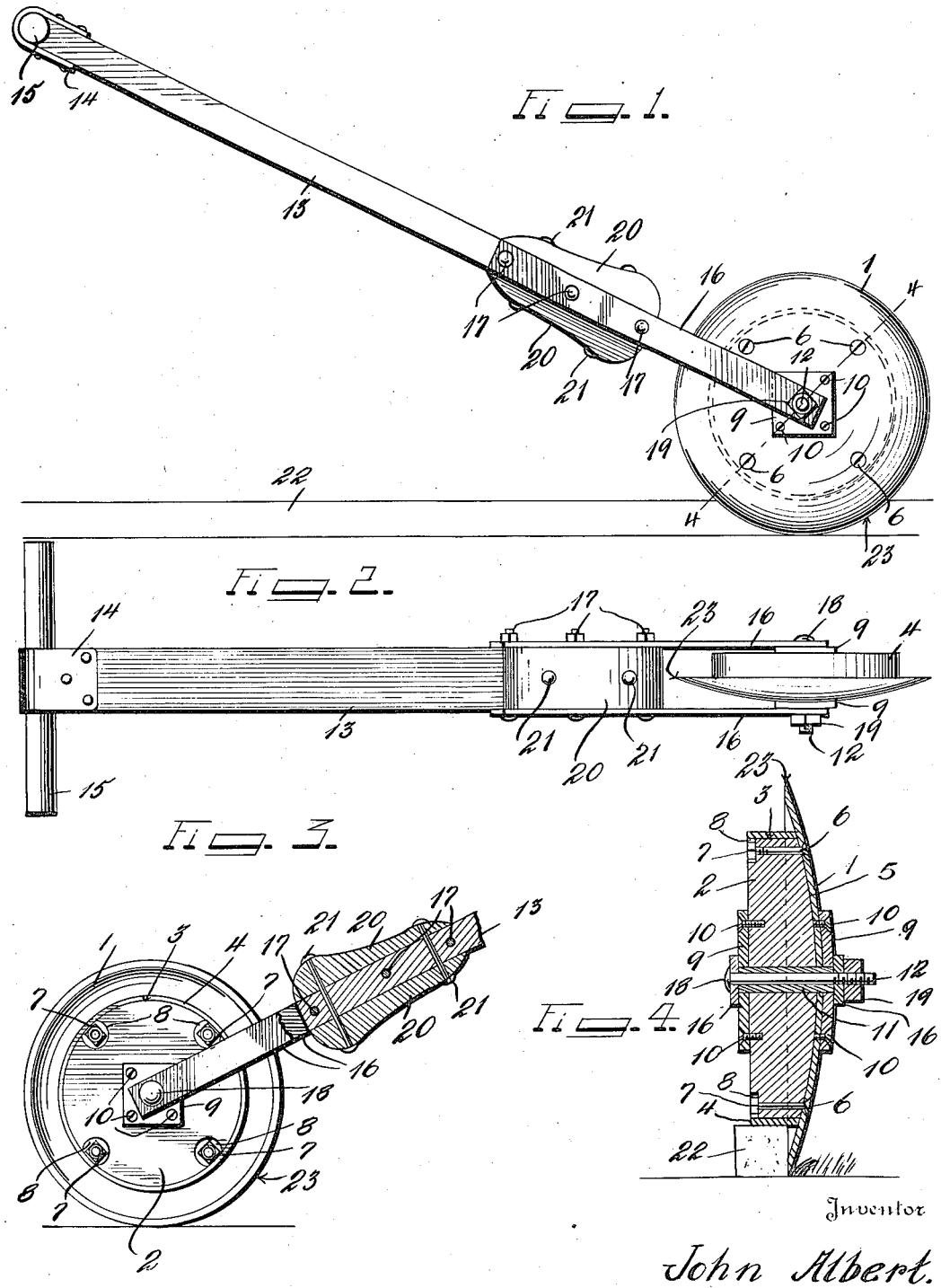
Witnesses
M. L. McDevitt
Chas. E. Smith
Inventor
John Albert.
By E. E. Vrooman & Co.,
his Attorneys

UNITED STATES PATENT OFFICE.

JOHN ALBERT, OF MISSOULA, MONTANA.

GRASS-CUTTER.

1,181,281.

Specification of Letters Patent.

Patented May 2, 1916.

Application filed October 26, 1915. Serial No. 58,017.

*To all whom it may concern:*

Be it known that I, JOHN ALBERT, a citizen of the United States of America, residing at Missoula, in the county of Missoula and State of Montana, have invented certain new and useful Improvements in Grass-Cutters, of which the following is a specification, reference being had therein to the accompanying drawing.

This invention relates to grass cutters and has for its principal object the production of a rotary cutter which will facilitate the cutting of grass growing adjacent to or over-lapping a curb or side edges of a walk.

Another object of this invention is the production of a rotary cutter which has a disk portion concavo-convex for the purpose of allowing the cutting edge thereof to bear against the curb or edge of the walk whereby the cutting edge will be automatically sharpened.

Another object of this invention is the production of a grass cutter wherein the cutting disk is fixedly mounted upon the wheel or body portion so that the wheel or body portion may ride upon the curb or walk while the disk owing to its bow structure in cross section thereby causing the grass cutter to be retained in its correct position at the same time when in use.

With these and other objects in view, this invention consists of certain novel combinations, constructions and arrangements of parts as will be hereinafter fully described and claimed.

In the accompanying drawing: Figure 1 is a side elevation of the grass cutter, as constructed in accordance with this invention. Fig. 2 is a top plan view of the grass cutter. Fig. 3 is a side elevation of the body portion or wheel of the grass cutter a portion of the handle being broken away and shown in section. Fig. 4 is a section taken on line 4—4 of Fig. 1.

Referring to the accompanying drawing by numerals it will be seen that the grass cutter comprises a disk 1 which is concavo-convex in cross section as clearly shown in Fig. 4. The body portion or wheel 2 is circular upon its outer periphery as shown at 3 in Fig. 3 and upon this outer periphery there is carried a wearing band 4. One side of this wheel or body 2 is beveled as indicated at 5 in Fig. 4 so as to conform in shape to the contour of the inner portion of the disk. Therefore, it will be seen that this wheel 2 will fit snugly upon the inner surface of the disk. The retaining bolts 6 pass through the disk and also through the body 2 so as to allow their threaded ends to retain the nuts 7. It will be seen by referring to Figs. 3 and 4 that the body 2 is provided with counter-sunken pockets 8 within which the nuts 7 are adapted to rest so as to provide a substantially even surface upon the outer side of the wheel or body 2. The plates 9 are carried upon the outer surfaces of the body 2 and disk 1 and are retained in position by means of the set screws 10. The hollow bushing 11 passes horizontally through the plates 9 body 2 and disk 1 as shown in Fig. 4 so as to carry the journal bolt 12.

The handle 13 is provided with a strap 14 for carrying the transversely extending grip 15. The straps 16 are secured to the side surfaces of the handle 13 by means of the bolts 17 so as to allow the forward ends of these straps 16 to extend for a considerable distance beyond the lower forward end of the handle 13. The forward ends of these straps are carried in parallel spaced relation so as to fit upon each side of the disk 1 and body 2. The forward ends of these straps 16 are mounted upon the bolt 12 and are retained in position by means of the head 18 of the bolt 12 and the nut 19. In this manner it will be seen that the disk and wheel are carried so as to freely rotate by being propelled by means of the handle 13. The weights 20 are carried upon the forward end of the handle 13 and are retained by the rivets 21 so that when in use the grass cutter will be positively held in engagement with the curb or walk so as to prevent sliding, skipping or non-cutting.

When this grass cutter is in operation the wearing band 4 of the body 2 will be positioned upon the curb 22 as shown in Figs. 1 and 4. The operator may then grasp the grip 15 so as to push or propel the handle 13 and this action will cause the straps 16 to move the grass cutter forwardly. As the body 2 rotates rotary motion will be imparted to the disk 1 by means of the bolts 6. As this disk rotates the convex outer surface will come into engagement with the soil or grass so as to be directed toward the curb 22. This action will force the cutting edge 23 of the disk into engagement with the side surface of the curb or walk 22. Therefore the grass adjacent this curb or walk will be severed so as to produce an even cut throughout the entire length of the curb or walk. It should be particularly remembered that the convex outer surface of the disk will direct the disk into engagement with the curb or walk while the concave construction of the disk will cause only the edge of the disk to engage the curb. Consequently, the edge will be beveled so as to provide a cutting edge, as shown clearly in Fig. 4. Furthermore, by having the body or wheel 2 provided with a beveled face resting in engagement with the concave surface of the disk the bolts and screws will positively retain the several elements in engagement with each other so as to form a rigid and substantial construction which will positively operate for cutting grass adjacent a walk when so desired.

What I claim is:

1. In a grass cutter of the class described the combination of a concavo-convex disk, a wheel fitting snugly upon the inner surface of said disk, means for retaining said wheel in engagement with said disk, said disk provided with a cutting edge formed at a distance from the outer periphery of said wheel, a pivot bolt passing through the central portion of said wheel and the disk, a handle member engaging said bolt whereby said handle member may propel said disk and wheel, said wheel being adapted to ride upon a curb thereby allowing the cutting edge of said disk to overlap the side edge of the curb whereby the convex surface of said disk will direct said disk inwardly toward the curb thereby allowing said cutting edge to bear upon the curb so as to cut the grass adjacent the curb, said cutting edge being continually in engagement with the curb so as to be automatically sharpened.

2. In a grass cutter of the class described the combination of the concavo-convex disk, a wheel having a circular outer periphery, said wheel provided with a beveled inner face conforming in shape to the contour of the inner surface of said disk, said wheel provided with a plurality of counter-sunken pockets, bolts passing through said disk and wheel, nuts engaging said bolts for holding said wheel in engagement with said disk, said nuts resting within said counter-sunken pockets so as to provide a substantially even surface upon the outer side of said wheel, the outer edge of said disk overhanging the outer periphery of said wheel, handle means engaging said disk and wheel for propelling the same whereby said wheel may ride upon a curb so as to allow said disk to overhang the curb thereby cutting the grass adjacent or overhanging the curb.

In testimony whereof I hereunto affix my signature.

JOHN ALBERT.